US008653936B2

(12) United States Patent
Matsumoto

(10) Patent No.: US 8,653,936 B2
(45) Date of Patent: Feb. 18, 2014

(54) REMOTE CONTROL DEVICE FOR AIR CONDITIONER

(75) Inventor: Takashi Matsumoto, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 439 days.

(21) Appl. No.: 12/899,202

(22) Filed: Oct. 6, 2010

(65) Prior Publication Data

US 2011/0084805 A1 Apr. 14, 2011

(30) Foreign Application Priority Data

Oct. 14, 2009 (JP) ................................ 2009-237765

(51) Int. Cl.
*G05B 13/00* (2006.01)

(52) U.S. Cl.
USPC ......... 340/3.7; 340/3.71; 340/13.25; 700/276

(58) Field of Classification Search
USPC ........................ 340/3.7, 3.71, 13.25; 700/276
See application file for complete search history.

(56) References Cited

U.S. PATENT DOCUMENTS

| | | | | |
|---|---|---|---|---|
| 6,310,609 | B1 * | 10/2001 | Morgenthaler | 345/170 |
| 2003/0074088 | A1 * | 4/2003 | Gonzales et al. | 700/19 |
| 2005/0090915 | A1 * | 4/2005 | Geiwitz | 700/90 |
| 2005/0108091 | A1 * | 5/2005 | Sotak et al. | 705/14 |
| 2006/0178945 | A1 * | 8/2006 | Sidlo et al. | 705/26 |
| 2007/0046492 | A1 * | 3/2007 | Fair et al. | 340/825.69 |
| 2009/0140056 | A1 * | 6/2009 | Leen | 236/49.3 |
| 2009/0293014 | A1 * | 11/2009 | Meuninck et al. | 715/810 |
| 2010/0318685 | A1 * | 12/2010 | Kraus et al. | 709/249 |

FOREIGN PATENT DOCUMENTS

| | | | |
|---|---|---|---|
| JP | 09-189442 | | 7/1997 |
| JP | 09-250793 | A | 9/1997 |
| JP | 10-259948 | A | 9/1998 |
| JP | 2000-088326 | A | 3/2000 |

(Continued)

OTHER PUBLICATIONS

Office Action (Notification of Reasons for Refusal) dated Nov. 29, 2011, issued in the corresponding Japanese Patent Application No. 2009-237765, and a partial English Translation thereof. (4 pages).

(Continued)

*Primary Examiner* — Andrew Bee
(74) *Attorney, Agent, or Firm* — Buchanan Ingersoll & Rooney PC

(57) ABSTRACT

The present invention is aimed at providing a remote control device for an air conditioner which makes it possible for a user to fully use added functions of the air conditioner without being unable to make a quick decision about or giving up added value functions, and to realize energy savings in the air conditioner without difficulty, by not adopting input with buttons, but by adopting inputs describing scenes in a daily life of the user by words. The remote control device for the air conditioner according to the present invention includes a chassis; an interface display unit, which is placed in a front surface of the chassis, and is formed by a full dot liquid crystal display; and a scene button, which is placed in a front surface of the chassis, to select and decide a scene selection that is displayed on the interface display unit.

2 Claims, 17 Drawing Sheets

(56) References Cited

FOREIGN PATENT DOCUMENTS

| | | | |
|---|---|---|---|
| JP | 2002-022250 | | 1/2002 |
| JP | 2002349931 | A | 12/2002 |
| JP | 2003-004278 | | 1/2003 |
| JP | 2004-164375 | A | 6/2004 |
| JP | 2006-196782 | A | 7/2006 |
| JP | 2006352805 | A | 12/2006 |
| JP | 2008-030674 | A | 2/2008 |
| JP | 2009-127960 | A | 6/2009 |
| JP | 2009-229009 | A | 10/2009 |

OTHER PUBLICATIONS

Office Action from Chinese Patent Office dated Jan. 4, 2013, issued in corresponding Chinese Patent Application No. 201010510876.2, with an English translation thereof.
Office Action from the Japan Patent Office dated Apr. 23, 2013, issued in corresponding Japanese Patent Application No. 2012-079550, with an English translation thereof. (4 pages).
Office Action from Chinese Patent Office dated Aug. 22, 2013, issued in corresponding Chinese Patent Application No. 201010510876.2, with English translation thereof. (6 pages).

* cited by examiner

SCENE SELECTION: "PURIFY AIR"

WHEN SELECTING MULTIPLE SCENE SELECTIONS

REMOTE CONTROL DEVICE FOR AIR CONDITIONER

BACKGROUND OF THE INVENTION

1. Field of the Invention

The present invention relates to a remote control device for an air conditioner.

2. Background Art

With increasing sophistication of air conditioners, and installation of high value-added devices on air conditioners, the number of buttons on remote controllers (remote control devices) sending signals to execute and stop functions with high value-added has continued to increase.

In order to deal with the increase in the number of buttons inside of the limited space on remote controllers, operation units of the interface between the remote controllers and users are configured by using the following methods, etc.:

(1) method to decrease the size of the buttons themselves;

(2) method to decrease the space between rows of aligned buttons; and (3) method to adopt an interface wherein multiple functions are selected by one button.

Therefore, the words to describe functions by each button themselves depend on the size of the buttons and the space between the buttons. Thus, this makes the operation to select the functions of air conditioners necessary for realizing comfort air-conditioning itself difficult for users. In the meantime, there is a problem that users cannot recognize the functions to be realized by pressing the buttons only with the words of functions indicated on or adjacent to the buttons, and give up even before operation.

Therefore, remote controllers for air conditioners which can reduce the burden on the users to operate are proposed (for example, see Japanese Unexamined Patent Publication No. 2009-127960).

DESCRIPTION OF THE RELATED ART

However, even the remote controller for air conditioner described in Japanese Unexamined Patent Publication No. 2009-127960 remains unable to solve the following problems.

The conventional interface technique involving input with plural buttons on a remote controller has problems that it requires complicated operations and it presents a complicated impression, such that a user feels uncertainty about how to perform setting with the remote controller appropriately in a life scene other than the usual life, such as when guests come over, etc., and the user does not know how to use functions which are not used on a daily basis at the time they are required, and ends up in giving up using the functions.

Further, it has a problem that a user cannot understand an effect and a function obtained by pressing a button from the indication of a name of a new added value on the button.

SUMMARY OF THE INVENTION

The present invention is aimed at resolving the above-mentioned problems, and providing a remote control device for an air conditioner which enables a user to fully use added functions of the air conditioner without being unable to make a quick decision about or giving up added value functions, by not adopting input with buttons but adopting input describing scenes in the daily life of the user by words, and to easily realize energy savings in the air conditioner.

A remote control device for an air conditioner according to the present invention includes a chassis; an interface display unit, which is placed in a front surface of the chassis, and is formed by a full dot liquid crystal display; and a scene button, which is placed in a front surface of the chassis, to select and decide a scene selection that is displayed on the interface display unit.

BRIEF DESCRIPTION OF THE DRAWINGS

A complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Embodiment 1.

Figure 1:
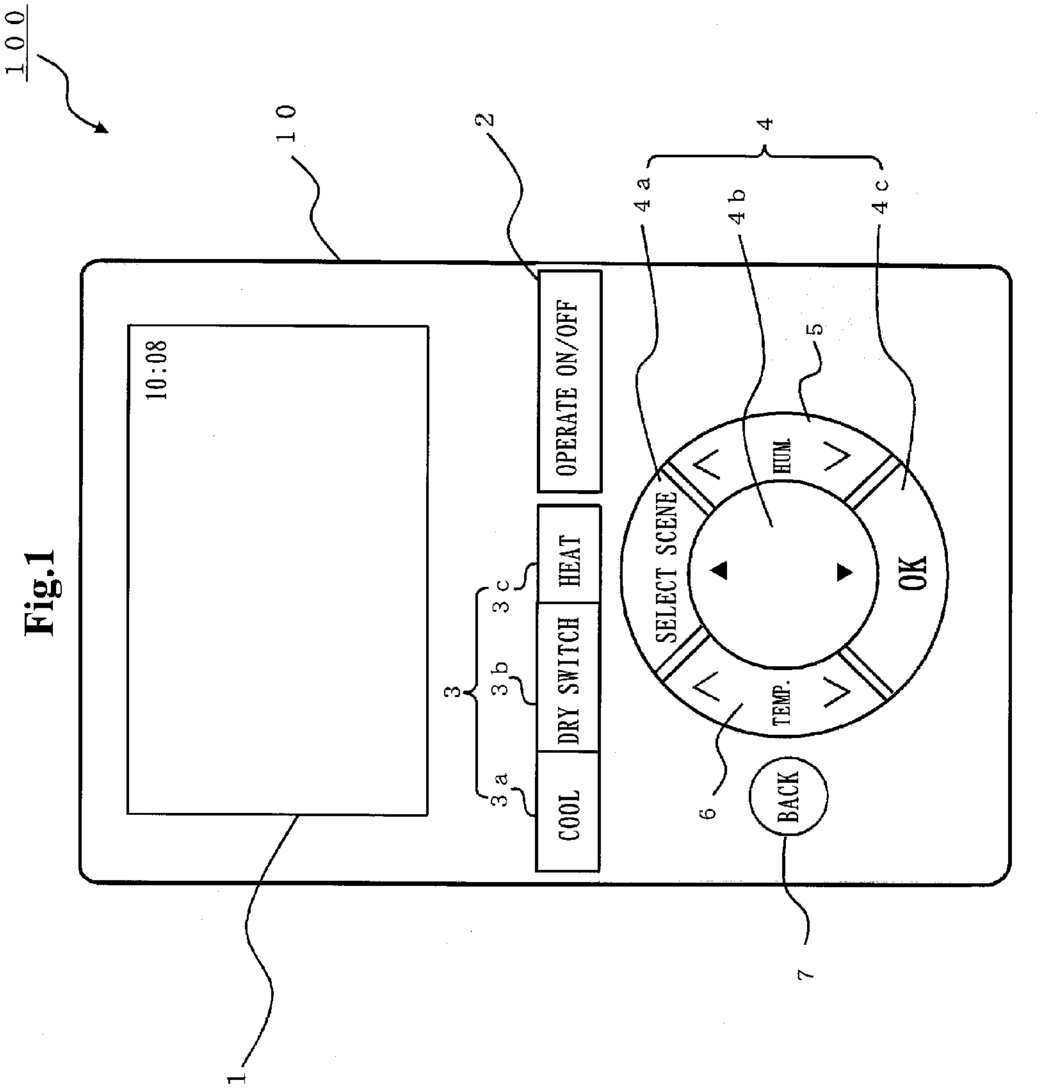
FIG. 1 is a diagram illustrating the first embodiment, and is a front view of an appearance of a remote controller 100.
Figure 2:
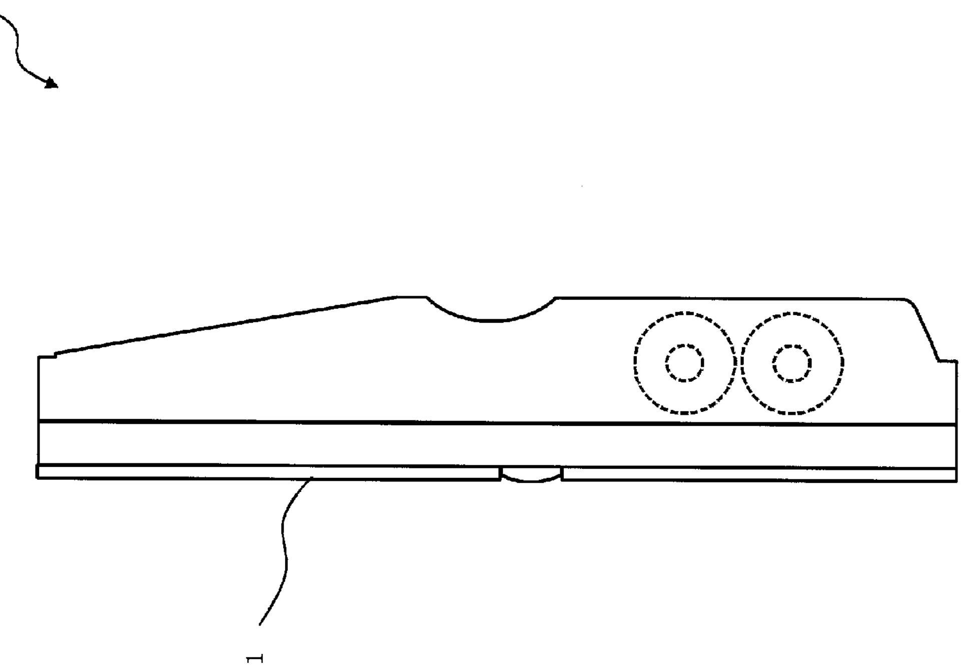
FIG. 2 is a diagram illustrating the first embodiment, and is a side view of the remote controller 100.
Figure 3:
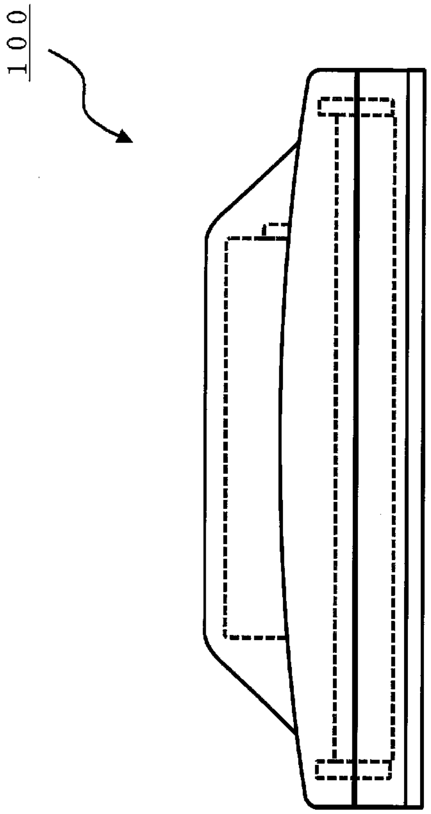
FIG. 3 is a diagram illustrating the first embodiment, and is a plane view of the remote controller 100.
Figure 4:
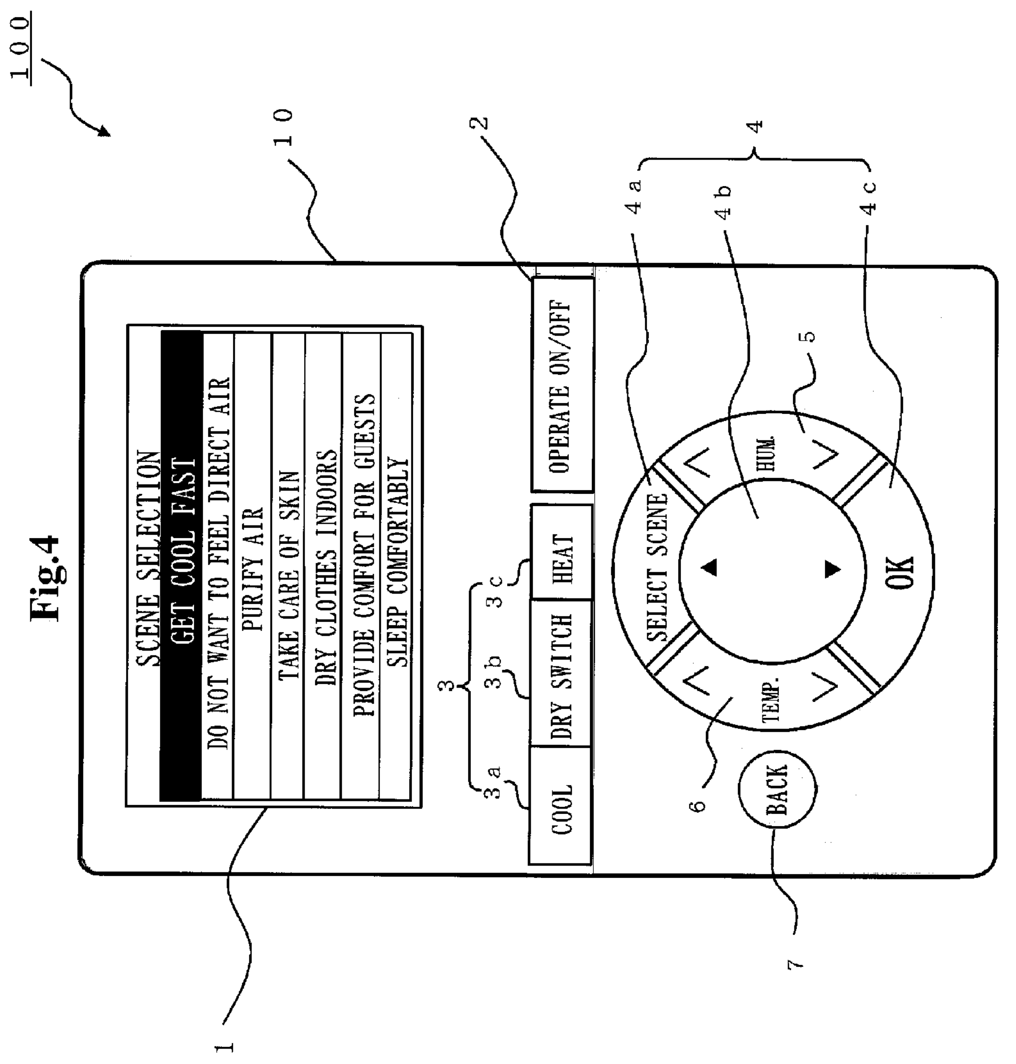
FIG. 4 is a diagram illustrating the first embodiment, and is a diagram illustrating a state when a scene selection screen is displayed on an interface display unit 1 of the remote controller 100, and a cursor is positioned on “get cool fast”
Figure 5:
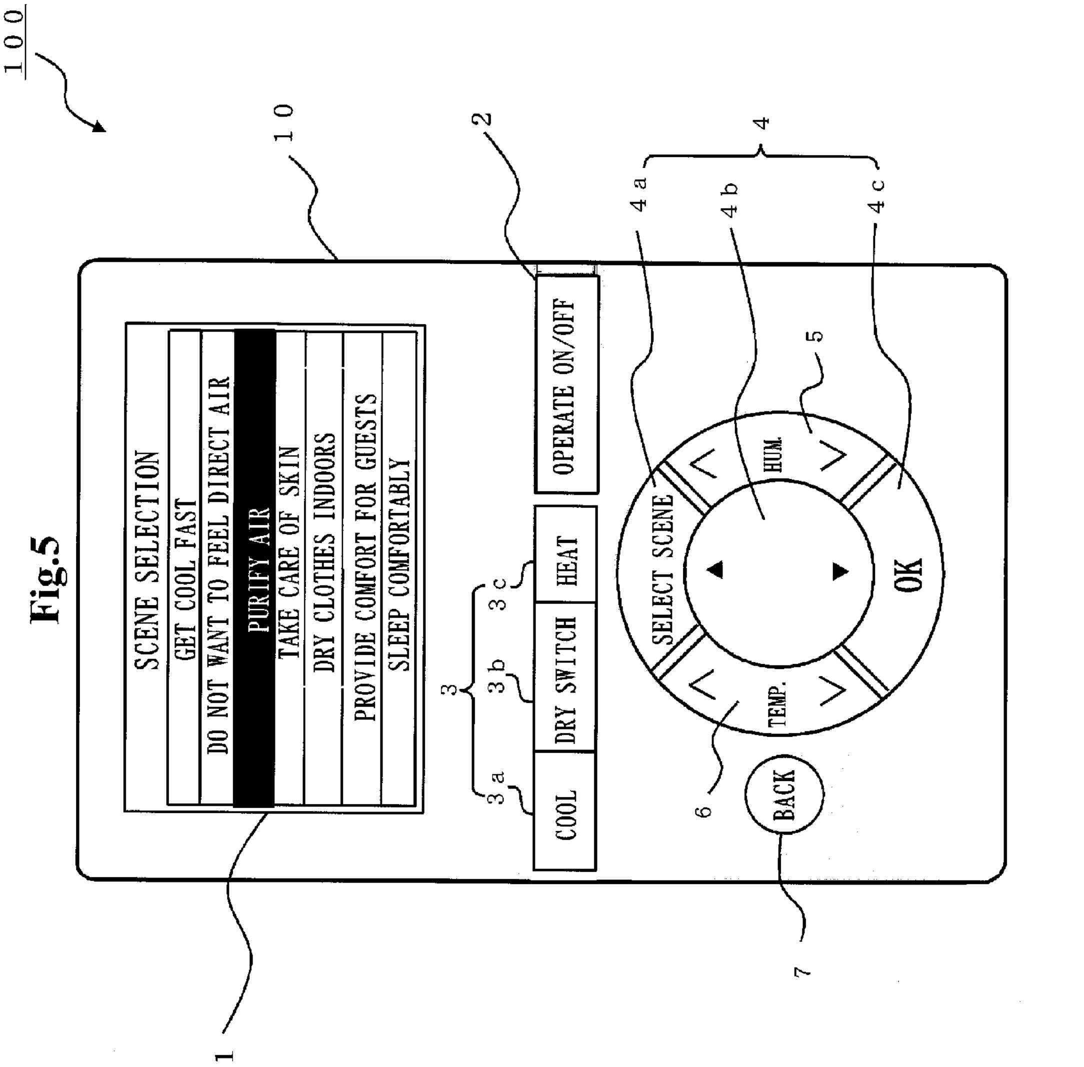
FIG. 5 is a diagram illustrating the first embodiment, and is a diagram illustrating a state when the scene selection screen is displayed on the interface display unit 1 of the remote controller 100, and the cursor is moved to “purify air”
Figure 6:
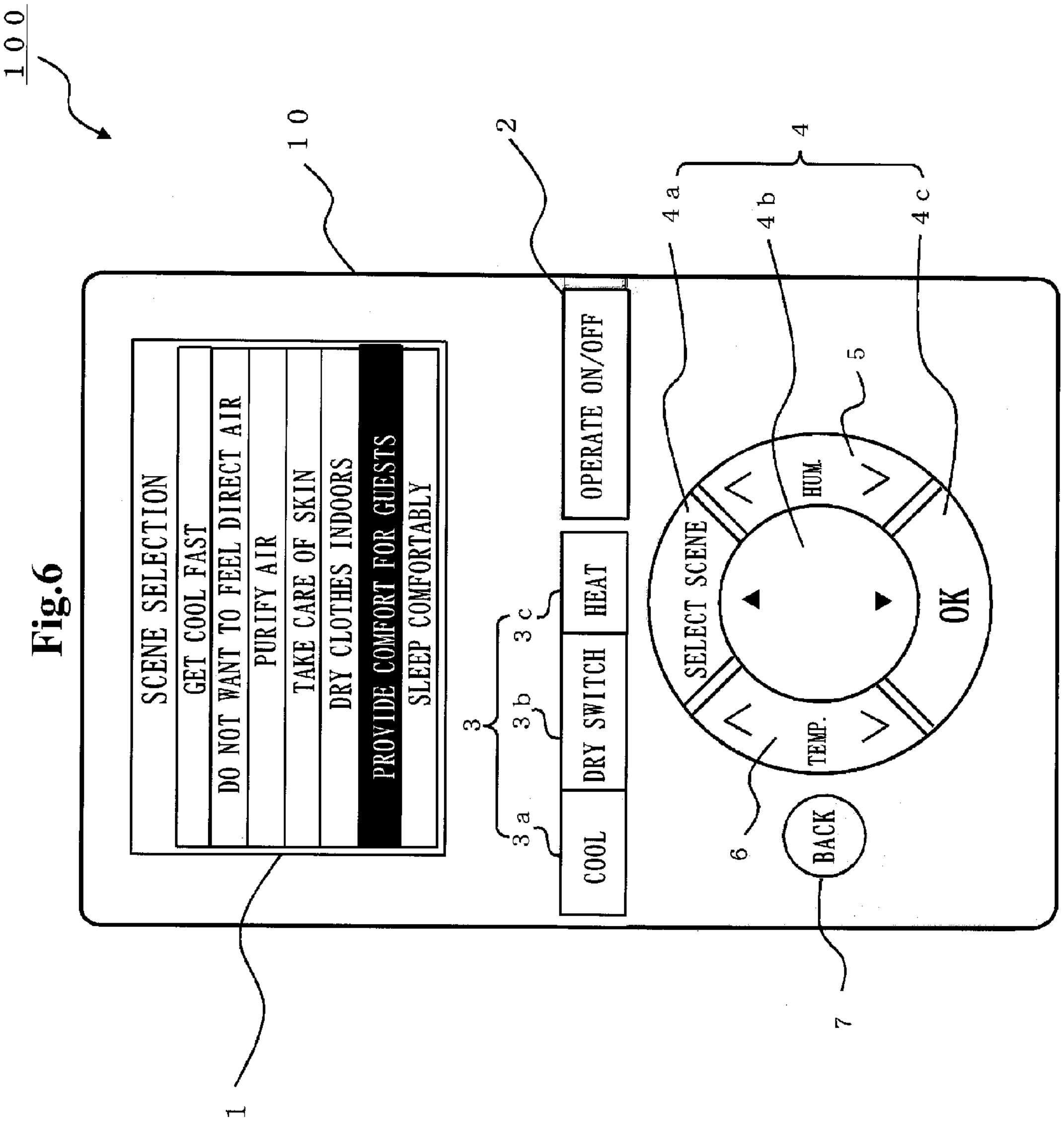
FIG. 6 is a diagram illustrating the first embodiment, and is a diagram illustrating a state when the scene selection screen is displayed on the interface display unit 1 of the remote controller 100, and the cursor is moved to “provide comfort for guests”
Figure 7:
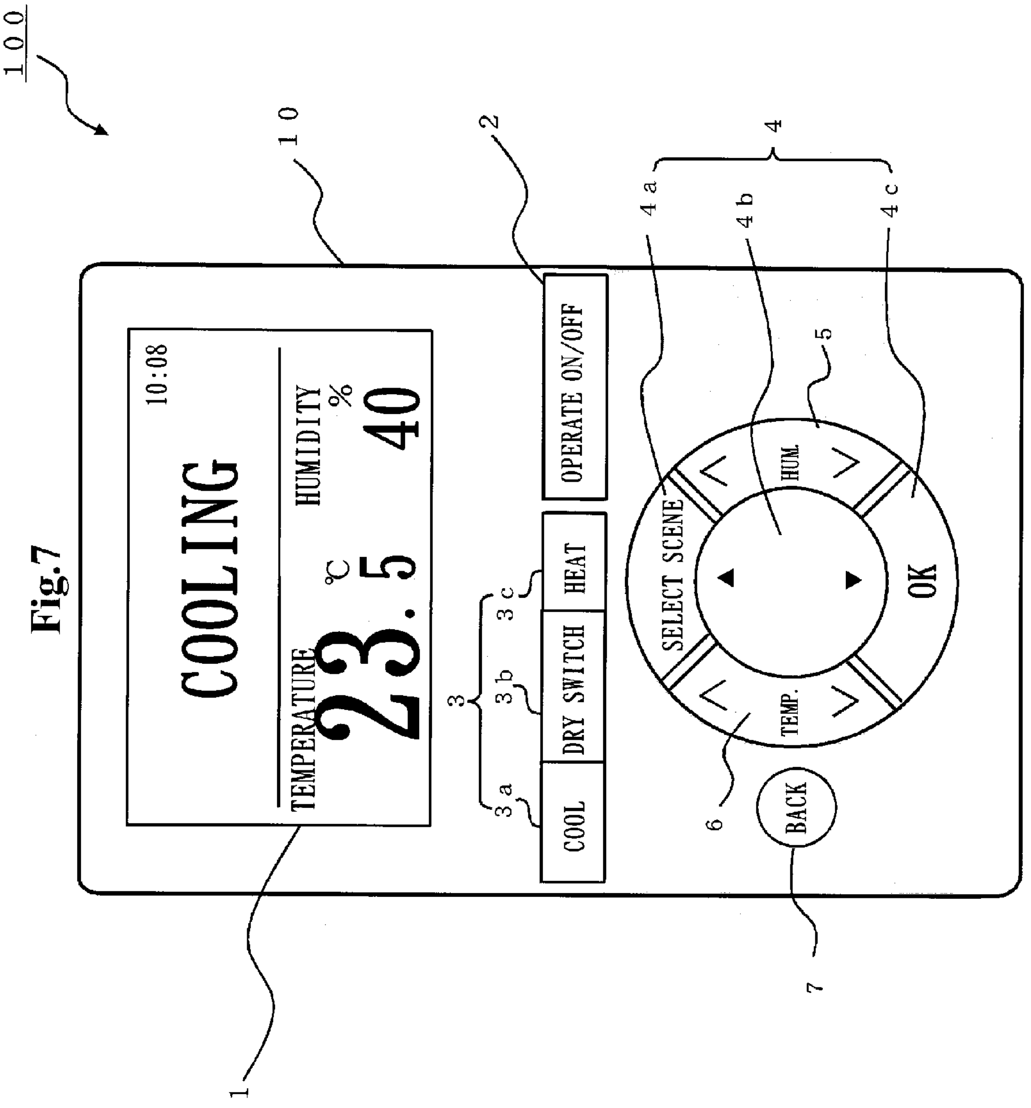
FIG. 7 is a diagram illustrating the first embodiment, and is a diagram illustrating a state when a regular screen is displayed on the interface display unit 1 of the remote controller 100.
Figure 8:
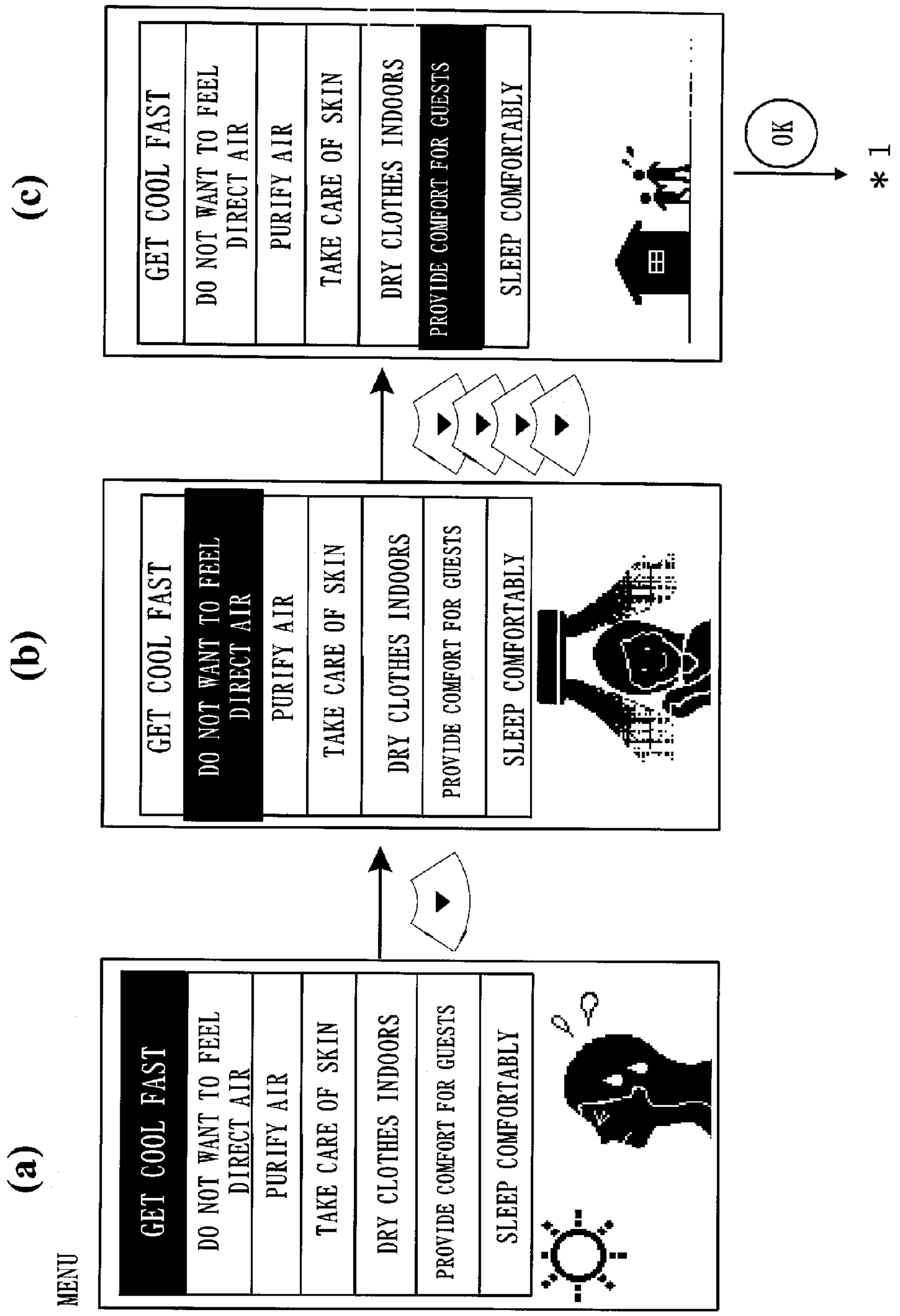
FIG. 8 is a diagram illustrating the first embodiment, and is a diagram illustrating states until a user selects a scene when the scene selection screen (menu screen) is displayed on the interface display unit 1 of the remote controller 100 ((*a*) of FIG. 8 is a state when the cursor is positioned on “get cool fast,” (*b*) of FIG. 8 is a state when the cursor is positioned on “do not want to feel direct air,” and (*c*) of FIG. 8 is a state when the cursor is positioned on “provide comfort for guests”)
Figure 9:
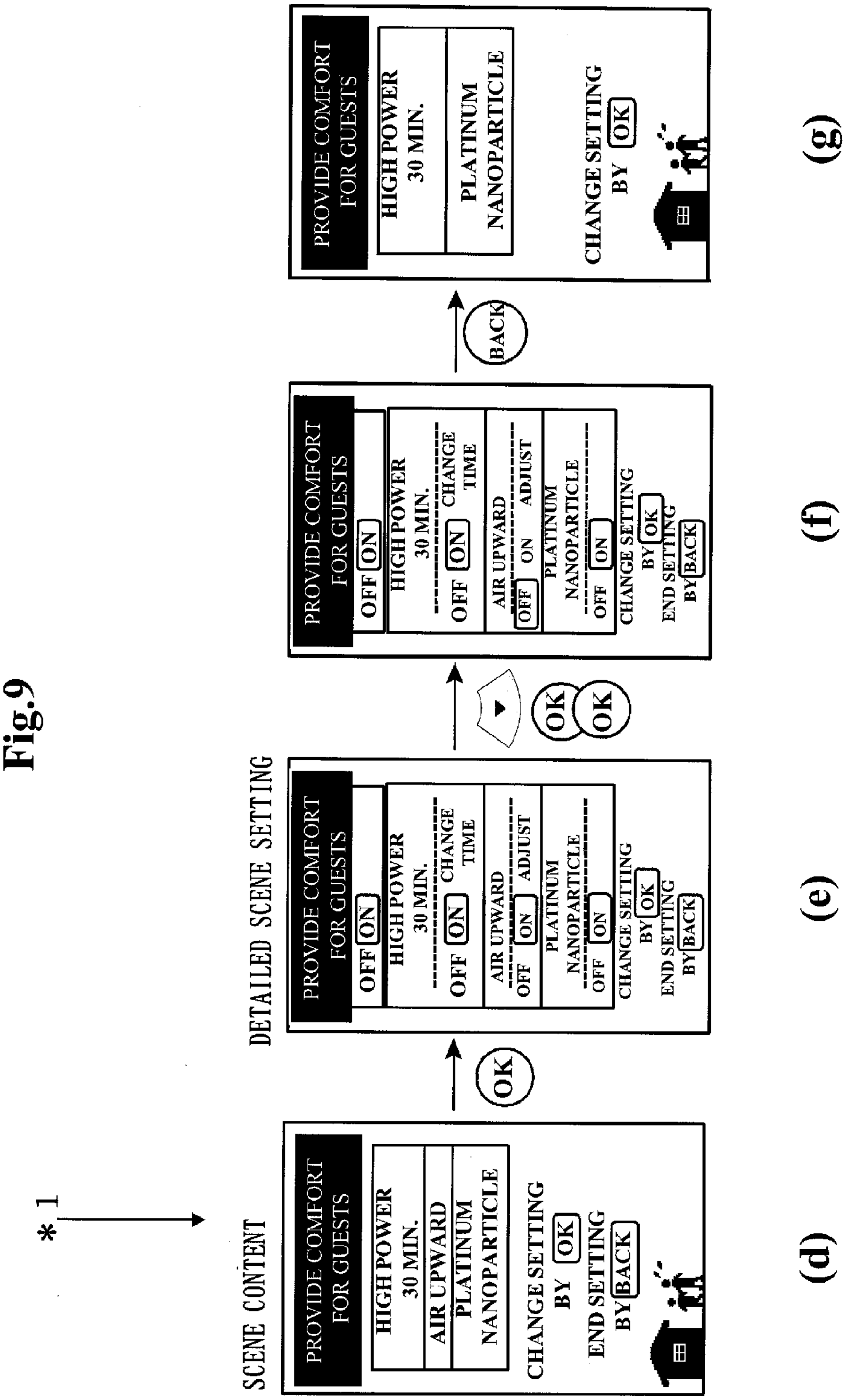
FIG. 9 is a diagram illustrating the first embodiment, and is a diagram illustrating states when “scene content” and “detailed scene setting” are displayed on the interface display unit 1 of the remote controller 100 ((*d*) of FIG. 9 illustrates “scene content,” and (*e*) through (*g*) of FIG. 9 illustrate “detailed scene setting”)
Figure 10:
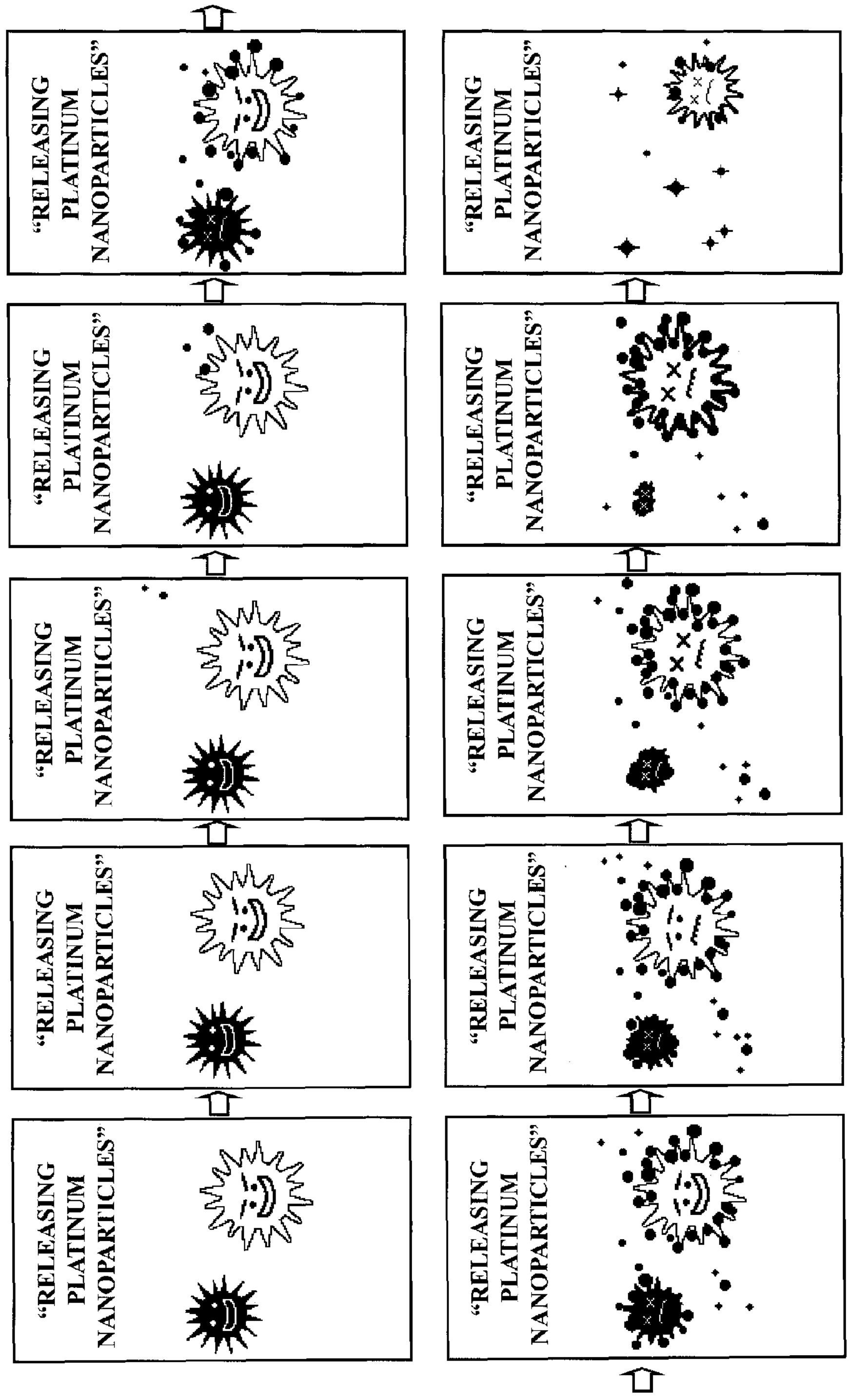
FIG. 10 is a diagram illustrating the first embodiment, and is a diagram illustrating an animation of the scene selection “purify air”
Figure 11:
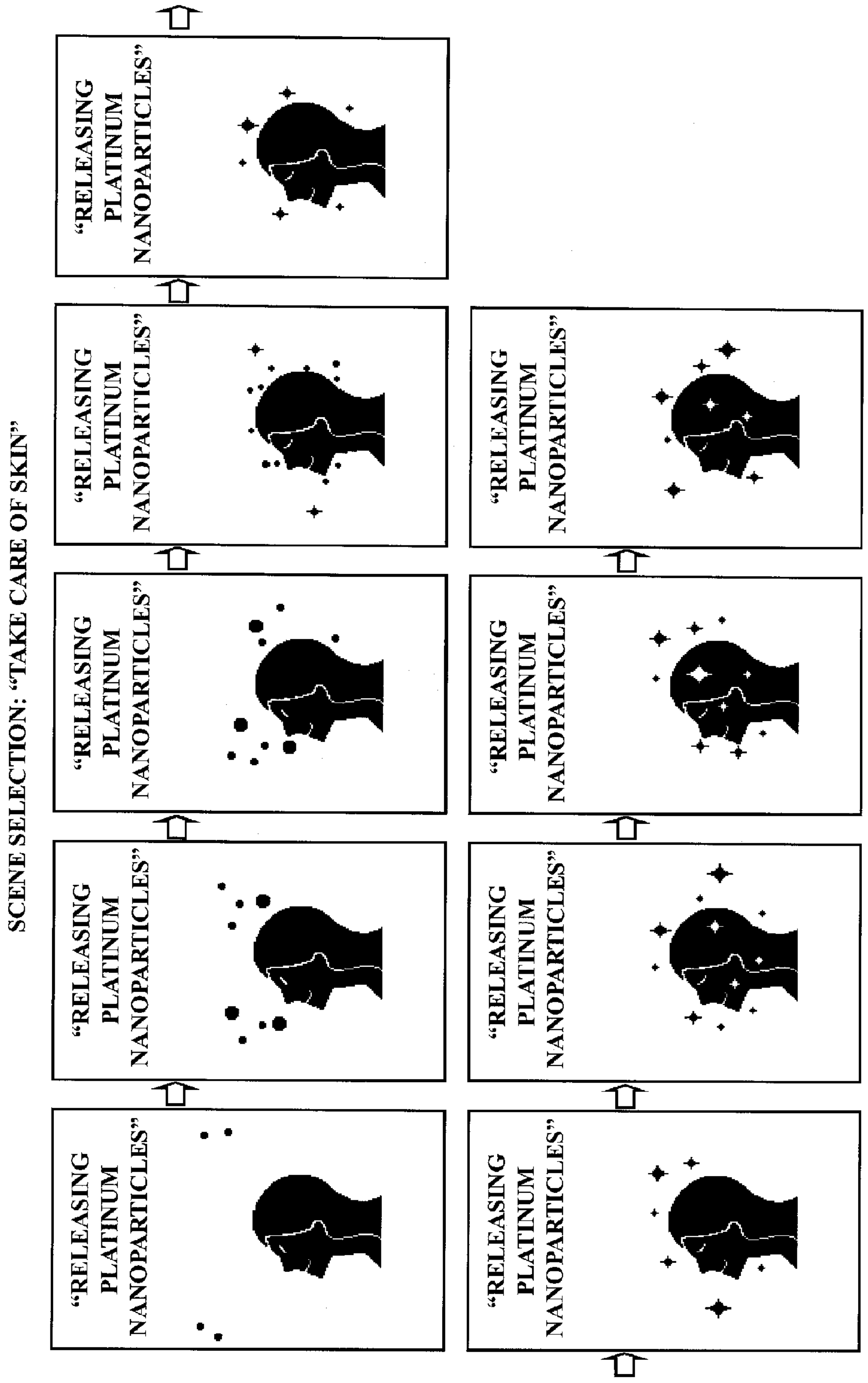
FIG. 11 is a diagram illustrating the first embodiment, and is a diagram illustrating an animation of the scene selection “take care of skin”
Figure 12:
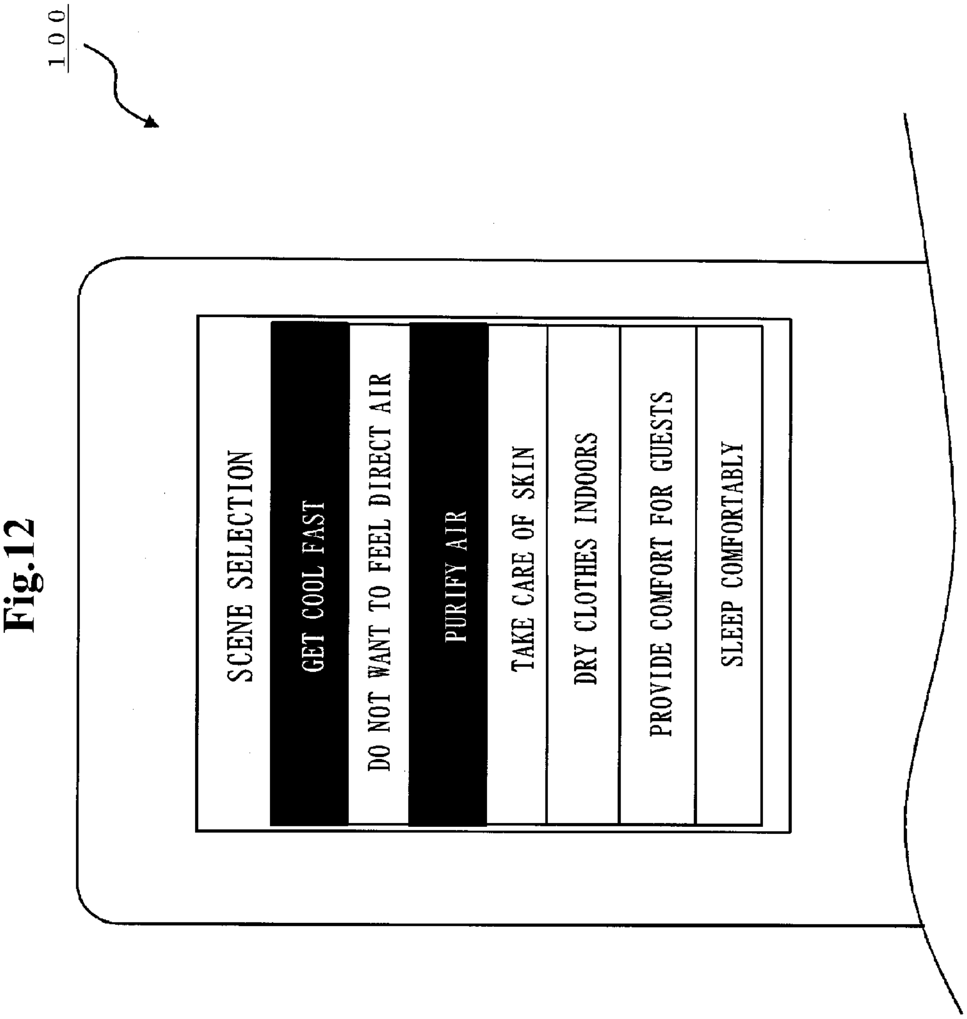
FIG. 12 is a diagram illustrating the first embodiment, and is an enlarged view of a selection screen of scene selection when plural contents of the scene selection are selected.
Figure 13:
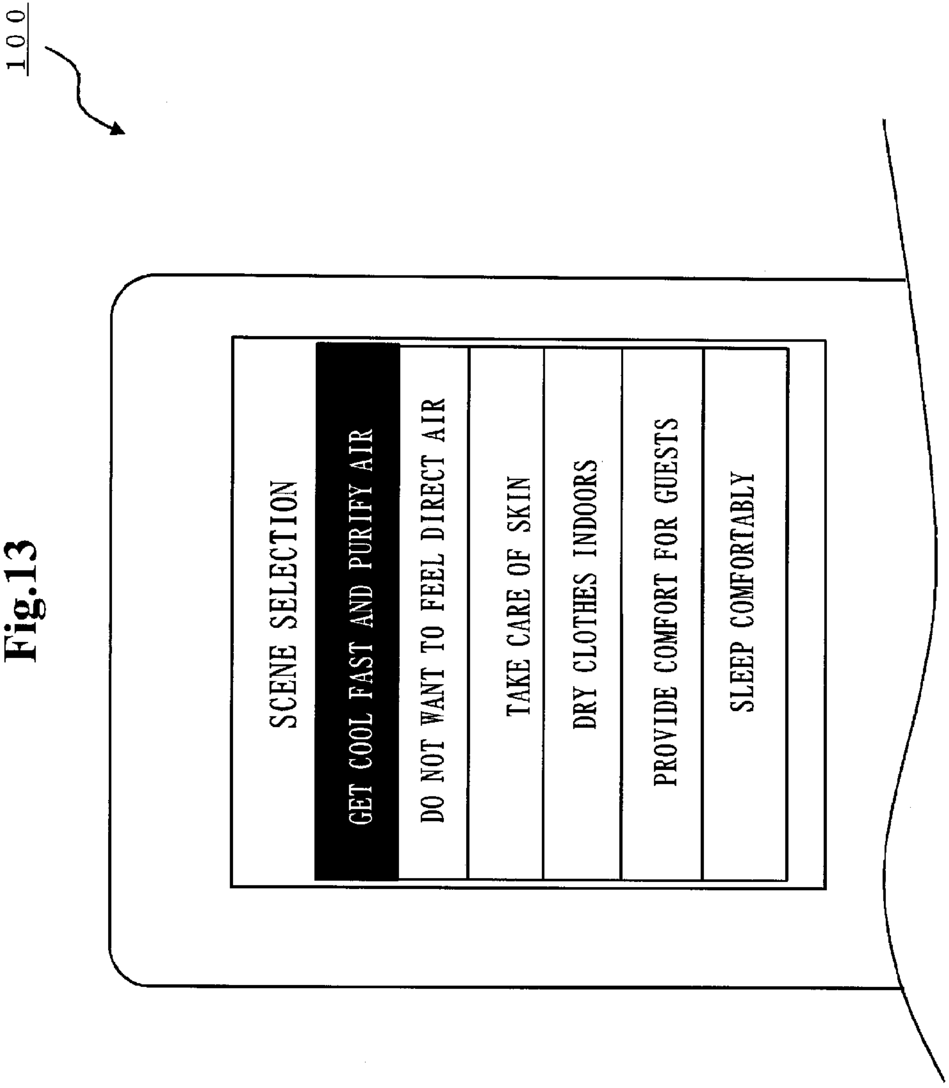
FIG. 13 is a diagram illustrating the first embodiment, and is a diagram illustrating a state when a combined scene selection such as “get cool fast and purify air” is displayed on the interface display unit 1 of the remote controller 100.

FIG. 1 through FIG. 13 are diagrams illustrating the first embodiment, where FIG. 1 is the front view of the appearance of the remote controller 100, FIG. 2 is the side view of the remote controller 100, FIG. 3 is the plane view of the remote controller 100, FIG. 4 is the diagram illustrating the state when the scene selection screen is displayed on the interface display unit 1 of the remote controller 100, and the cursor is positioned on "get cool fast," FIG. 5 is the diagram illustrating the state when the scene selection screen is displayed on the interface display unit 1 of the remote controller 100, and the cursor is moved to "purify air," FIG. 6 is the diagram illustrating the state when the scene selection screen is displayed on the interface display unit 1 of the remote controller 100, and the cursor is moved to "provide comfort for guests," FIG. 7 is the diagram illustrating the state when the regular screen is displayed on the interface display unit 1 of the remote controller 100, FIG. 8 is the diagram illustrating the states until a user selects the scene when the scene selection screen (menu screen) is displayed on the interface display unit 1 of the remote controller 100 ((*a*) of FIG. 8 is the state when the cursor is positioned on "get cool fast," (*b*) of FIG. 8 is the state when the cursor is positioned on "do not want to feel direct air," and (*c*) of FIG. 8 is the state when the cursor is positioned on "provide comfort for guests"), FIG. 9 is the diagram illustrating the states when "scene content" and "detailed scene setting" are displayed on the interface display unit 1 of the remote controller 100 ((*d*) of FIG. 9 illustrates "scene content," and (*e*) through (*g*) of FIG. 9 illustrate "detailed scene setting"), FIG. 10 is the diagram illustrating the animation of the scene selection "purify air," FIG. 11 is the diagram illustrating the animation of the scene selection "take care of skin," FIG. 12 is the enlarged view of the selection screen of scene selection when the plural contents of the scene selection are selected, and FIG. 13 is the diagram illustrating the state when the combined scene selection such as "get cool fast and purify air" is displayed on the interface display unit 1 of the remote controller 100.

Figure 14:
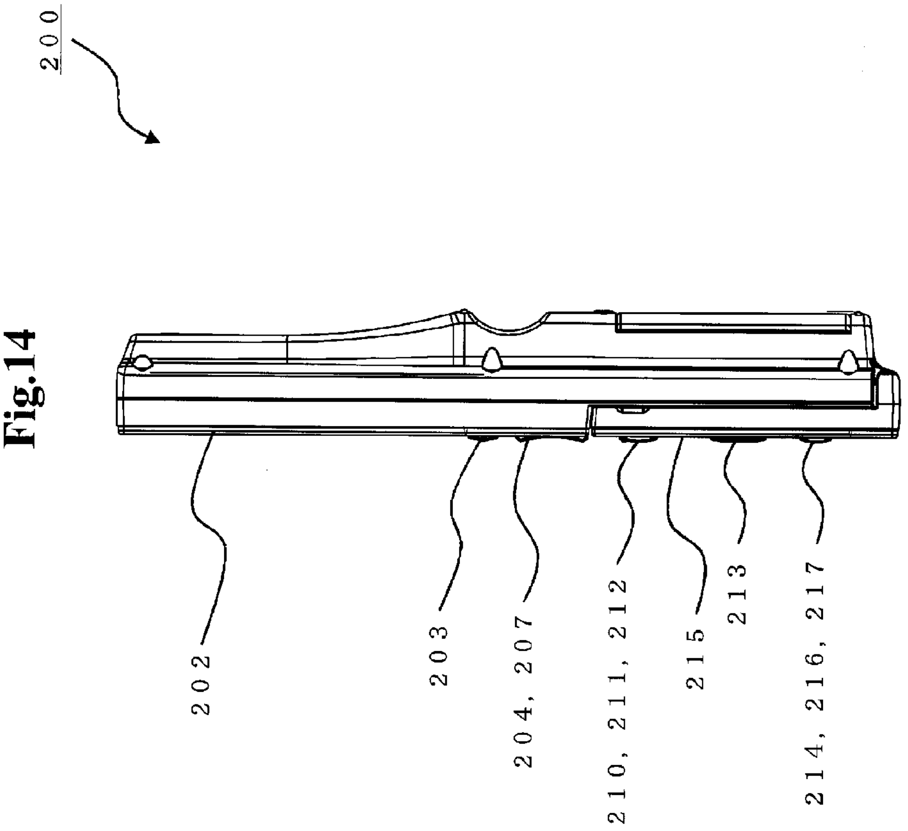
FIG. 14 is a diagram shown for comparison, and is a side view at the time a flap of a general remote controller 200 is closed.
Figure 15:
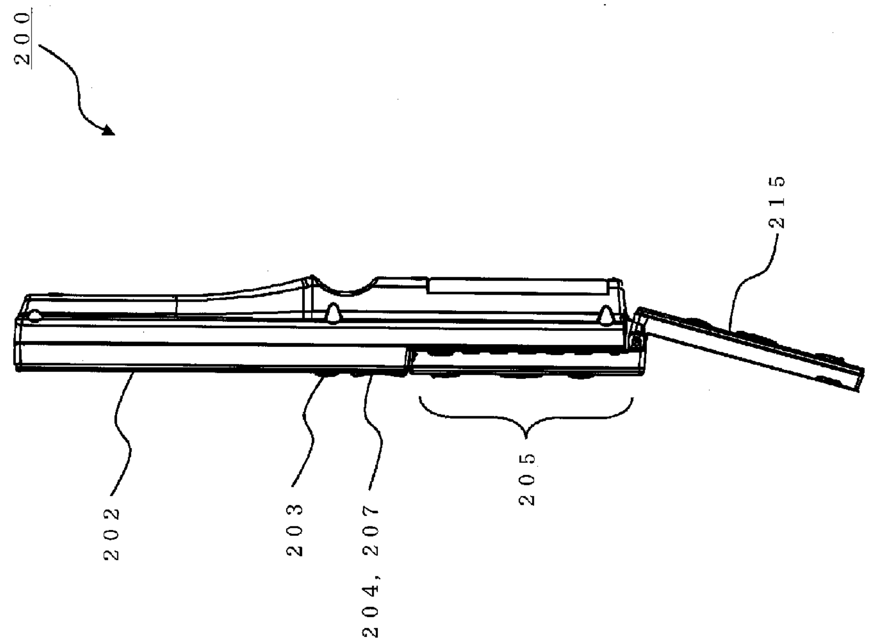
FIG. 15 is a diagram shown for comparison, and is a side view at the time the flap of the general remote controller 200 is opened.
Figure 16:
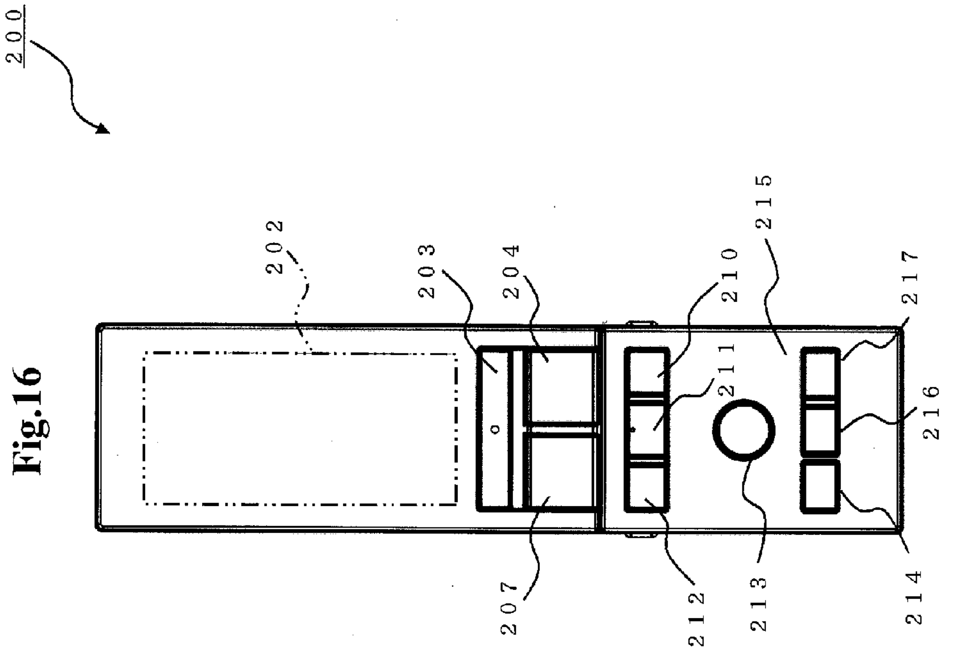
FIG. 16 is a diagram shown for comparison, and is a front view at the time the flap of the general remote controller 200 is closed.
Figure 17:
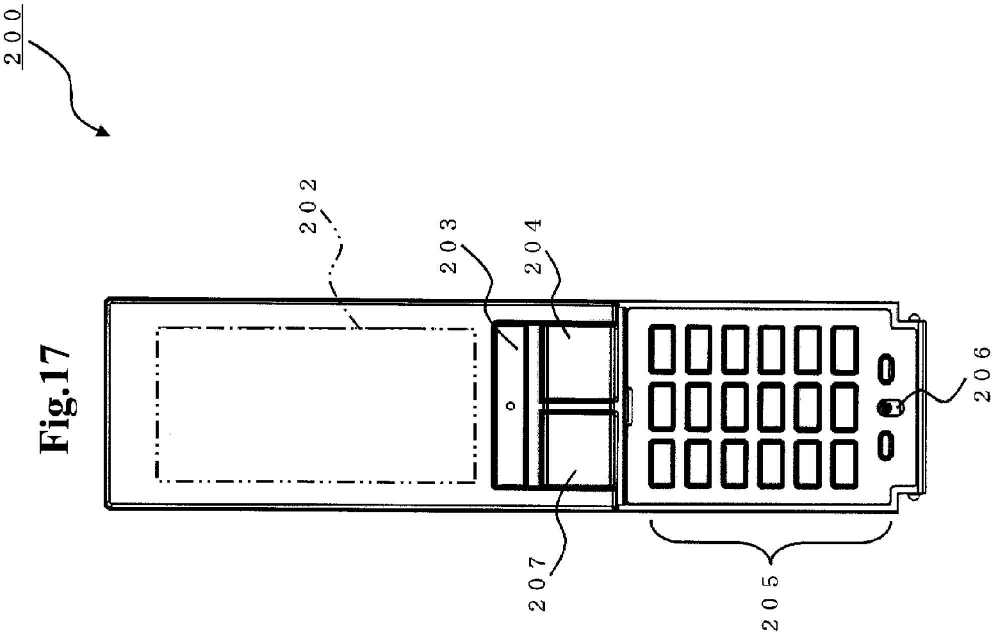
FIG. 17 is a diagram shown for comparison, and is a front view at the time the flap of the general remote controller 200 is opened.

FIG. 14 through FIG. 17 are diagrams illustrated for comparison, where FIG. 14 is the side view at the time the flap of the general remote controller 200 is closed, FIG. 15 is the side view at the time the flap of the general remote controller 200 is opened, FIG. 16 is the front view at the time the flap of the general remote controller 200 is closed, and FIG. 17 is the front view at the time the flap of the general remote controller 200 is opened.

The structure of the remote controller 100 (remote control device) is described with reference to FIG. 1 through FIG. 3.

The remote controller 100 illustrated in FIG. 1 through FIG. 3 is a stick type remote controller with a main body 10 (chassis) having an approximately quadrangular shape in front view. The remote controller 100 has a shorter length in a longitudinal direction (vertical direction in FIG. 1) than general stick type remote controllers. That is, the remote controller 100 is compact in size with a landscape-oriented screen.

One of the characteristics of the remote controller 100 illustrated in FIG. 1 through FIG. 3 is that the number of buttons operated by a user is significantly smaller than that of the general remote controllers. The details will be discussed later.

The remote controller 100 illustrated in FIG. 1 displays only a time on the interface display unit 1 in the upper front surface of the main body 10 of the remote controller since an air conditioner, not shown in the diagram, is being turned off.

A full-dot (255×160) LCD (liquid crystal display), for example, is used for the interface display unit 1.

It is made possible to eliminate the display limitation (functional limitation that only prescribed contents can be displayed in a prescribed area) of the segmented display used in interface display units for conventional remote controllers, and to offer discretionary expressions and animations inside the interface screen.

In an approximately center part of the remote controller 100 below the interface display unit 1, an operation ON/OFF button 2 and an operation mode switching button 3 are arranged.

Whereas the operation ON/OFF button 2 is located on the right side and the operation mode switching button 3 is located on the left side in FIG. 1, the reverse is also acceptable.

The operation mode switching button 3 is composed of a cooling button 3*a*, a dry switching button 3*b* and a heating button 3*c*.

A scene button 4, a humidity conditioning button 5 and a temperature conditioning button 6 are arranged inside of one circle below the operation ON/OFF button 2 and the operation mode switching button 3.

The scene button 4 is composed of a scene selection button 4*a*, an up-and-down button 4*b* and an OK button 4*c*.

The up-and-down button 4*b* is placed at the central part in the large circle, and is formed in a circular shape.

The scene selection button 4*a*, the humidity conditioning button 5, the OK button 4*c* and the temperature conditioning button 6 are arranged in a doughnut shape.

A back button 7 is placed in the immediate left of the scene button 4, the humidity conditioning button 5 and the temperature conditioning button 6. The back button 7 includes functions such as end setting, for example, as will be described below.

An explanation is provided of a method for using the remote controller 100. When starting the operation of an air conditioner in a state when the air conditioner is being turned off, by pressing the operation ON/OFF button 2, or any one of the cooling button 3*a*, the dry switching button 3*b* and the heating button 3*c* of the operation mode switching button 3, the air conditioner starts operation.

In order to perform cooling operation, press the operation ON/OFF button 2, or the cooling button 3*a* of the operation mode switching button 3. When the operation ON/OFF button 2 is pressed, the operation mode of the last time is performed. For example, if the last mode was cooling, cooling is performed this time again. When an operation mode different from the last operation mode is desired, press the button of the operation mode further. For example, if the last mode was dehumidification operation and cooling operation is desired to be performed this time, dehumidification operation starts by pressing the operation ON/OFF button 2, but by further pressing the cooling button 3*a* of the operation mode switching button 3, cooling operation starts.

The air conditioner starts operation from a turned-off state by pressing the operation ON/OFF button 2, or any one of the cooling button 3*a*, the dry switching button 3*b* and the heating button 3*c* of the operation mode switching button 3. At this time, the interface display unit 1 of the remote controller 100 displays a scene selection screen (see FIG. 4).

When a prescribed time elapses after a user selects the scene selection, the interface display unit 1 of the remote controller 100 switches to the regular screen (setting screen of temperature, humidity, etc.), as will hereinafter be described in detail.

In order to have the scene selection screen displayed when the interface display unit 1 of the remote controller 100 displays the regular screen and a scene is not set yet, press the scene selection button 4*a* of the scene button 4; then the interface display unit 1 displays the scene selection screen.

Next, the contents of the scene selection are described. The interface display unit 1 displays the most appropriate feeling of a user which fits the life scene (the content the user wants to set at the moment). The contents of entries in the scene selection are as follows, for example:

(1) get cool fast (heat fast);

(2) do not want to feel direct air (want to feel air);

(3) purify air;

(4) dry clothes indoors;

(5) take care of skin;

(6) provide comfort for guests; and (7) sleep comfortably.

When a user presses the scene selection button 4*a* of the scene button 4 to set the scene at the time the air conditioner starts operation or during operation of the air conditioner, the scene selection screen (menu screen) as shown in FIG. 4, for example, is displayed on the interface display unit 1 of the remote controller 100. The cursor is placed on the top "get cool fast."

The user moves the cursor to a desired content of entry by the up-and-down button 4*b* of the scene button 4. For example, in order to select "purify air," the user presses "▼" of the up-and-down button 4*b* twice in the state shown in FIG. 4, and then the cursor moves to "purify air" as shown in FIG. 5.

Meanwhile, in order to select "provide comfort for guests," the user presses "▼" of the up-and-down button 4*b* five times in the state shown in FIG. 4, and then the cursor moves to "provide comfort for guests" as shown in FIG. 6.

An explanation is provided below of the flow of selecting a content of entry in the scene selection screen (menu screen), a selected scene content and a detailed scene setting with reference to FIG. 8 and FIG. 9.

First, when the scene selection button 4*a* of the scene button 4 is pressed for scene setting at the time the air conditioner starts operation or during the operation of the air conditioner, the interface display unit 1 of the remote controller 100 displays, for example, the scene selection screen (menu screen) as shown in (*a*) of FIG. 8. The cursor is placed on the top "get cool fast."

Then, when a user presses "▼" of the up-and-down button 4*b* of the scene button 4 once, the cursor moves to "do not want to feel direct air" as shown in (*b*) of FIG. 8.

It is assumed here that the content the user wants to set is "provide comfort for guests" and not "do not want to feel direct air." Accordingly, the user further presses "▼" of the up-and-down button 4*b* of the scene button 4 four times, and moves the cursor to "provide comfort for guests" as shown in (*c*) of FIG. 8.

The OK button 4*c* of the scene button 4 is pressed in the state when the cursor is placed on "provide comfort for guests." Then, the scene content is displayed on the interface display unit 1 of the remote controller 100 as shown in (*d*) of FIG. 9.

In this case, "High power 30 min," "Air Upward," and "Platinum nanoparticle" are displayed from the top in this order as a content of "provide comfort for guests," for example.

When the scene content needs not be changed here, the back button 7 is pressed to result in scene conclusion. When a prescribed time elapses after the scene conclusion, the interface display unit 1 of the remote controller 100 switches to the regular screen (setting screen of temperature, humidity, etc.) (see FIG. 7).

In the meantime, when the user desires to switch "Air Upward" in the scene content to OFF, for example, the user presses the OK button 4*c* of the scene button 4.

Then, the interface display unit 1 of the remote controller 100 displays a detailed scene setting screen as shown in (*e*) of FIG. 9.

The detailed scene setting screen displays, for example, "provide comfort for guests OFF ON," "High power 30 min. OFF ON Change time," "Air Upward OFF ON ADJ," and "Platinum nanoparticle OFF ON" from the top in this order. While ON is surrounded by a square in (*e*) of FIG. 9 to display ON is turned on, it is underlined in this example.

The triangle cursor on the left end of the detailed scene setting screen in (*e*) of FIG. 9 is positioned on "High power 30 min. OFF ON Change time."

It is here assumed that the user desires to change the setting of "Air Upward" to OFF.

Accordingly, the user presses "▼" of the up-and-down button 4*b* of the scene button 4 once, and moves the triangle cursor to "Air Upward OFF ON ADJ."

Then, the user presses the OK button 4*c* twice, and switches the setting to "Air Upward OFF ON ADJ" ((*f*) of FIG. 9).

Further, the user presses the back button 7 and ends the setting. Then, the interface display unit 1 of the remote controller 100 displays "High power 30 min" and "Platinum nanoparticle" from the top in this order as a content of "provide comfort for guests" as shown in (*g*) of FIG. 9.

When a prescribed time elapses after that, the interface display unit 1 of the remote controller 100 switches to the regular screen (setting screen of temperature, humidity, etc.) (see FIG. 7).

An additional explanation is provided of the scene selection screen (menu screen) in (*a*) through (*c*) of FIG. 8. For example, while most of the interface display unit 1 of the remote controller 100 is used for the scene selection screen (menu screen) in (*a*) through (*c*) of FIG. 8, the contents of entries in the scene selection and an animation corresponding to the selected (whereon the cursor is placed) scene are displayed in the lower part of the interface display unit 1 as shown in each diagram.

When the cursor is placed on the top "get cool fast" as shown in (*a*) of FIG. 8, an animation of a person being exposed to sunlight and getting sweaty is displayed in the lower part of the interface display unit 1 as shown in (*a*) of FIG. 8.

When the cursor is placed on "do not want to feel direct air" as shown in (*b*) of FIG. 8, an animation wherein a flow of a conditioned air from an air conditioner is divided while avoiding a person is displayed in the lower part of the interface display unit 1, as shown in (*b*) of FIG. 8.

When the cursor is placed on "provide comfort for guests" as shown in (*c*) of FIG. 8, an animation wherein a person (guest) is approaching a house is displayed in the lower part of the interface display unit 1, as shown in (*c*) of FIG. 8.

Each animation of (*a*) through (*c*) of FIG. 8 does not continue to show the same picture, but changes from moment to moment. Each of (*a*) through (*c*) of FIG. 8 shows one picture among the animation.

There are two ways of methods to display the animations for the scene selection screen (menu screen) in (*a*) through (*c*) of FIG. 8. One method is to display the animations below the scene selection screen (menu screen) as shown in (*a*) through (*c*) of FIG. 8.

Another method is to display only the scene selection screen first, and to display the animation on the entire screen of the interface display unit 1 of the remote controller 100 after a prescribed time elapses (for example, several seconds later). In this way, a user can understand the content of the scene well. When the user presses the OK button 4*c* at an appropriate time while the animation is displayed after that, the screen moves to the scene content of (*d*) of FIG. 9.

Next, an example is provided of the animations which change from moment to moment. FIG. 10 is an example of the animation at the time when the scene selection is "purify air." At the top of the interface display unit 1 of the remote controller 100 is displayed "Releasing platinum nanoparticles." The animation changes according to the order of the arrows. What are illustrated as small circles or having rhombic shapes in the diagram are colloidal platinum nanoparticles. It is recognized that viruses in the air disappear or become reduced in size by colloidal platinum nanoparticles.

The animation at the time when the scene selection is "purify air" described in FIG. 10 is displayed below the scene selection screen, or on the entire screen of the interface display unit 1, when the cursor is placed on "purify air" in the scene selection screen.

It is characterized in that a device having a function to remove viruses in the air is operated as a method to purify the air, etc. is described by the phrase of "Releasing platinum nanoparticles," and by displaying the animation which gives a user an idea of the content of the function as shown above.

By displaying the content of disinfecting the viruses in the air by colloidal platinum nanoparticles by way of the animation, it is possible to convey the content of the function to users in an understandable way. In this way, users can fully use the functions held by the air conditioner; therefore, it is possible to enforce more energy-saving operations among the users.

FIG. 11 is one example of the animation at the time the scene selection is "take care of skin." At the top of the interface display unit 1 of the remote controller 100 is displayed "Releasing platinum nanoparticles." The animation changes according to the order of the arrows. What are illustrated as small circles in the diagram are colloidal platinum nanoparticles. It is recognized that a skin is moisturized by the colloidal platinum nanoparticles acting on a human face.

FIG. 12 is an enlarged view of the selection screen of scene selection when plural contents of the scene selection are selected. As shown, it is possible to select two (plural) scene selections. In this way, it is possible to deal with various conditions and feelings, such as a user cannot satisfy own neediness by selecting one scene selection, and so on.

In the example of FIG. 12, two scene selections of "get cool fast" and "purify air" are selected. It is also acceptable to select more than one scene selections.

In addition, the display priority of the scene selection is to display the displayed contents in decreasing order of frequent-use from the top of the interface display unit 1, and the order of the displayed contents is changed when the selection screen is displayed next time according to the frequency of use and selection by users.

Further, the content of entries in the scene selection is also altered by learning frequencies of multiple selections and combinations of scene selections.

For example, when the multiple selection of the scene selections of "get cool fast" and "purify air" is used frequently, a combined scene selection such as "get cool fast and purify air" is newly displayed (see FIG. 13).

As described above, the scene selection which is easy for a user to handle, and which suits the life of the user is provided.

Further, the function of an instruction manual of an air conditioner accompanying the product is partially taken over by displaying and describing the product functions on the interface display unit 1 of the remote controller 100.

A general remote controller for air conditioner will be described briefly in order to clarify the features of the present embodiment.

The general remote controller 200 for air conditioner will be described with reference to FIG. 14 through FIG. 17.

The general remote controller 200 for air conditioner illustrated in FIG. 14 through FIG. 17 is a stick type remote controller in vertically long shape.

The remote controller 200 is equipped with a display unit 202 to display operation modes such as cool, dry, heat, etc., and operation statuses of set temperature, set humidity, wind speed, wind direction, etc. of an air conditioner.

An ON/OFF button 203 to operate and stop the air conditioner is placed below the display unit 202.

A humidity adjustment button 204 to adjust humidity and a temperature adjustment button 207 to adjust temperature are placed side by side on the right and left side below the ON/OFF button 203.

The remote controller 200 includes a remote controller flap 215 below the humidity adjustment button 204 to adjust humidity and the temperature adjustment button 207 to adjust temperature. The remote controller flap 215 opens downward (see FIG. 15).

Buttons which are operable when the remote controller flap 215 is in a closed state are placed on the surface of the remote controller flap 215. As shown in FIG. 16, a heating button 210, a dry switching button 211 and a cooling button 212 are placed side by side on the right and left side in the upper part of the surface of the remote controller flap 215.

An information navigation button 213 (energy-saving operation information requesting button) which requests information of the air conditioner is formed in an approximately center of the surface of the remote controller flap 215.

An OFF timer button 217, an ON timer button 216 and a fan button 214 are placed side by side on the right and left side in the lower part of the surface of the remote controller flap 215 below the information navigation button 213.

A group of detailed setting buttons 205 which appear when the remote controller flap 215 opens are placed below the temperature adjustment button 207 and the humidity adjustment button 204. The group of detailed setting buttons 205 are used when a detailed setting of a wind speed and a wind direction of the air blown out from an indoor unit, and a timer, etc. is performed, for example.

A flap opening and closing detection switch 206 which detects opening and closing of the remote controller flap 215 is placed in the center of the lowest portion of the group of detailed setting buttons 205.

A protrusion (not shown) which presses the flap opening and closing detection switch 206 to turn the flap opening and closing detection switch 206 on from off state at the time the remote controller flap 215 is closed is formed on the back of the remote controller flap 215.

As shown above, the remote controller 200 for an air conditioner includes a number of buttons on the surface of the remote controller 200 and the remote controller flap 215. Therefore, the remote controller 200 of the air conditioner has problems that it requires complicated operations and it presents a complicated impression, such that a user feels uncertainty about how to perform setting with the remote controller appropriately in a life scene other than the usual life, and the user does not know how to use functions which are not used on a daily basis at the time they are required, and ends up in giving up using the functions. Further, it has a problem that the user cannot understand an effect and a function obtained by pressing a button from the indication of a name of a new added value on the button.

The number of the operation buttons is substantially reduced in the remote controller 100 of the present embodiment in comparison to the general remote controller 200, as discussed above. Further, the remote controller 100 does not include the remote controller flap 215 as the general remote controller 200.

It is possible to control various air conditioners by selecting and determining the scene selection (menu) displayed on the interface display unit 1 of the remote controller 100 by only operating the scene button 4 on behalf of operating multiple buttons.

Furthermore, the scene selection (menu) displayed on the interface display unit 1 of the remote controller 100 is to describe scenes in a daily life of a user by words, and animations of the scenes are displayed. Therefore, the user can fully use added functions of the air conditioner without being unable to make a quick decision about or giving up added value functions.

When the scene selections (menu) displayed on the interface display unit 1 of the remote controller 100 are large in number, and cannot be displayed at once on the interface display unit 1, all the scene selections can be selected and determined by scrolling.

The relation between the scene selection (menu) displayed on the interface display unit 1 of the remote controller and various buttons of the general remote controller 200 will be slightly described.

For example, "get cool fast" in the scene selection corresponds to "high power button" among the group of detailed setting buttons 205 of the general remote controller 200.

Further, the scene selection "do not want to feel direct air" corresponds to "wind/wind deflector button" among the group of detailed setting buttons 205 of the general remote controller 200.

Furthermore, the scene selection "purify air" corresponds to "mist button" of the general remote controller 200.

Additionally, the scene selection "take care of skin" corresponds to "mist button" of the general remote controller 200.

Furthermore, the scene selection "dry clothes indoors" corresponds to "laundry button" of the general remote controller 200.

Further, the scene selection "sleep comfortably" corresponds to "sleep button" of the general remote controller 200.

As described above, the various buttons of the general remote controller 200 can be replaced by the content of entries in the scene selection displayed on the interface display unit 1 of the remote controller 100. In the above explanation, the relation between some buttons of the general remote controller 200 and the content of entries in the scene selection displayed on the interface display unit 1 of the remote controller 100 is described. All the buttons of the general remote controller 200 can be replaced by the scene selection displayed on the interface display unit 1 of the remote controller 100, the explanation of which is omitted herein.

Thus, in the remote controller 100 of the present embodiment, the buttons of the general remote controller 200 which are large in number and difficult to understand are not adopted, and are replaced by the scene selection displayed on the interface display unit 1, which is to describe scenes in the daily life of a user by words, and animations of the scenes are displayed. Therefore, the user can fully use added functions of the air conditioner without being unable to make a quick decision about or giving up added value functions, and can easily realize energy savings in the air conditioner, by not adopting input with buttons, but by using the entries describing scenes in the daily life of the user by words.

Further, by describing an effect of an added value of an air conditioner to realize needs of the user which is selected through entering a life scene by expression in words and animations, it is possible to convey benefits with ease, and save the effort and necessity to bother referring to an instruction manual accompanying the product.

The remote control device for the air conditioner according to the present invention makes it possible for a user to fully use added functions of the air conditioner without being unable to make a quick decision about or giving up added value functions, by not adopting input with buttons, but having the user select and enter scene selections describing scenes in a daily life of the user by words which are displayed on the interface display unit, so that it is possible for the user to realize energy savings in the air conditioner without difficulty.

Having thus described several particular embodiments of the present invention, various alterations, modifications, and improvements will readily occur to those skilled in the art. Such alterations, modifications, and improvements are intended to be part of this disclosure, and are intended to be within the spirit and scope of the present invention. Accordingly, the foregoing description is by way of example only, and is not intended to be limiting. The present invention is limited only as defined in the following claims and the equivalents thereto.

What is claimed is:

1. A remote control device for an air conditioner comprising:

a chassis;

an interface display unit placed in a front surface of the chassis, the interface display unit displaying, on a screen, a plurality of scene selections each of which describes a feeling of user in a daily life scene of the user by a word and is associated with at least one function of the air conditioner; and a scene button placed in the front surface of the chassis to select and decide a scene selection among the plurality of scene selections displayed by the interface display unit, wherein more than one scene selection among the plurality of scene selections displayed by the interface display unit can be selected simultaneously, and wherein the interface display unit alters a content to be displayed on the screen, in accordance with frequency of more than one scene selection being selected simultaneously and with a combination of the selected more than one scene selections.

2. A remote control device for an air conditioner comprising:

a chassis;

an interface display unit placed in a front surface of the chassis, the interface display unit displaying, on a screen, a plurality of scene selections each of which describes a feeling of user in a daily life scene of the user by a word and is associated with at least one function of the air conditioner; and a scene button placed in the front surface of the chassis to select and decide a scene selection among the plurality of scene selections displayed by the interface display unit, wherein more than one scene selection among the plurality of scene selections displayed by the interface display unit can be selected simultaneously, and wherein the interface display unit displays a combination of more than one scene selections selected simultaneously with more frequency than a certain threshold, as a new scene selection, on the screen.

* * * * *